(12) United States Patent
Sadagopan et al.

(10) Patent No.: US 8,583,502 B2
(45) Date of Patent: Nov. 12, 2013

(54) VALUE MAXIMIZING RECOMMENDATION SYSTEMS

(75) Inventors: Narayanan Sadagopan, Sunnyvale, CA (US); Zhaohui Zheng, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 675 days.

(21) Appl. No.: 12/838,169

(22) Filed: Jul. 16, 2010

(65) Prior Publication Data

US 2012/0016772 A1  Jan. 19, 2012

(51) Int. Cl.
*G06Q 30/00* (2012.01)

(52) U.S. Cl.
USPC ........................................... 705/26.1

(58) Field of Classification Search
USPC ..................... 705/26, 27, 26.1, 26.7
See application file for complete search history.

(56) References Cited

U.S. PATENT DOCUMENTS

| 8,417,573 | B2 * | 4/2013 | Slaney et al. ............... 705/26.1 |
|---|---|---|---|
| 2006/0085818 | A1 | 4/2006 | Bodlaender |
| 2008/0033821 | A1 | 2/2008 | Jacobi |
| 2008/0228587 | A1 | 9/2008 | Slaney |
| 2010/0145740 | A1 * | 6/2010 | Claverie et al. ................ 705/5 |
| 2010/0145766 | A1 * | 6/2010 | Begeja et al. .................. 705/10 |
| 2010/0250336 | A1 * | 9/2010 | Selinger et al. ................ 705/10 |

FOREIGN PATENT DOCUMENTS

KR  10-2010-0045195 A  3/2010

OTHER PUBLICATIONS

Shannon Claude E., "XXII. Programming a Computer for Playing Chess," Bell Telephone Laboratories, Inc, Philosophical Magazine, Series.7, vol. 41, No. 314, dated Mar. 1950, 18 pages.
Korean Intellectual Property Office, "International Search Report with Written Opinion" received in PCT Application No. PCT/US11/42980 dated Dec. 16, 2011 (5 pages).
Current Claims, Application No. PCT/US11/42980, dated Dec. 2011, (4 pages).

* cited by examiner

*Primary Examiner* — Mila Airapetian
(74) *Attorney, Agent, or Firm* — Hickman Palermo Truong Becker Bingham Wong LLP (57) ABSTRACT

A server determines a plurality of immediate candidate items for a first web page to recommend to a user. For each particular immediate candidate item of the plurality of immediate candidate items, the server determines a separate sequence of two or more subsequent possible candidate items for subsequent web pages to recommend to the user in the event that the user selects the particular immediate candidate item. Further, the server selects a particular immediate candidate item from the plurality of immediate candidate items for the first web page to recommend to the user. The first web page that recommends the plurality of immediate candidate items is generated and sent over the Internet to the user.

24 Claims, 3 Drawing Sheets

VALUE MAXIMIZING RECOMMENDATION SYSTEMS

FIELD OF THE INVENTION

The present invention relates to candidate item recommendation systems and, more specifically, to a technique for determining which items to recommend to customers at the present time, by evaluating trees of subsequent items that could be recommended to the customers in the future, wherein the trees of subsequent items are generated for each immediate item available for recommendation to the customers at the present time.

BACKGROUND

A growing popularity of the Internet has spurred a rapid growth of Internet websites that promote various products and services to the users. For example, Internet-based shopping websites advertise, recommend, and sell books, clothing items, jewelry items, home goods items, etc. Movie-rental websites distribute copies of movies. News websites market copies of electronic documents, access to newsgroups, access to news media, etc. Game websites promote and sell electronic games, memberships to fan clubs, etc. Music websites sell music files, music media, etc. Travel websites sell airline tickets, vacation packages, etc. Entertainment websites sell tickets to concerts, shows, etc. Websites affiliated with social organizations recommend candidates for a board election, etc. These and many other types of websites attempt to promote their candidate items, objects, services, products, people, and/or other entities to the users.

Regardless of the nature of the candidate items promoted by a website, the candidate items are selected by determining those candidate items that meet specific objectives specified by the website designers or sponsors. For example, one objective may be to maximize the number of sales transacted by the website. In a book-selling example, the objective may be accomplished by recommending, to the users, the books that are bestsellers and that are most likely going to be purchased by the customers. In a travel-package-selling example, the objective may be accomplished by recommending, to the users, the travel packages that are the most popular and are in a highest demand.

Another objective may be to maximize the revenue generated from the sales of products by the website. In the book-selling example, the objective may be accomplished by recommending the books that are not only very popular, but also most expensive. Similarly, in the travel-package-selling example, the objective may be accomplished by recommending the travel packages that are not only in high demand, but also luxurious.

However, in formulating the objectives, the existing recommending systems rely on approaches that merely take into a consideration the candidate items that are presently recommended to the users. In the book-selling example, the system selects and simultaneously recommends, to the user, one or more book candidates, hoping that the objective is met when the user selects and/or purchases one of the simultaneously and presently recommended books.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

It has been observed that the users who follow recommendations presented by a website do so not just sporadically or irregularly, but habitually and quite frequently. For example, a user who purchased a recommended book from one website often continues purchasing the recommended books from the same website. Furthermore, if one customer purchased a copy of a first book and then subsequently purchased a copy of a second book, then, quite often, another customer who purchased a copy of the first book eventually will also purchase a copy of the second book. Moreover, if two customers purchased two or more books in a particular order, then, most likely, other customers will purchase the same two or more books in that same particular order.

Techniques described herein look beyond the immediate selection of candidate items. In determining which candidate item recommendations ought to be made at a particular moment, a recommendation process takes into consideration not only the candidate items that are suitable for recommendation in the present, but also possible subsequent recommendations that will become beneficial for making in the future as a consequence of certain candidate items being recommended in the present. The selection of candidate items for recommendation described herein is based on not only the individual characteristics of the candidate items themselves, but also on the potential sequences of event selection that are predicted to follow the event of presently recommending the candidate items to the user.

Techniques described herein determine which items to recommend to customers by generating and evaluating trees of subsequent items that could be recommended to the customers in the future. The trees of subsequent items are generated for each immediate item available for recommendation to the customers at the present time.

The process of generating the trees of subsequent items is recursive. It starts from selecting one or more immediate candidate items available for recommendation to the customer at the present moment. Then, for each immediate candidate item, the process determines first-tier-subsequent items that could be recommended to the customer immediately after the customer hypothetically selected the particular immediate item. Then, for each immediate candidate item and for each subsequent item, the process determines second-tier-subsequent items that could be recommended to the customer immediately after the customer hypothetically selected the particular first-tier-subsequent item. The process is repeated until all trees for all immediate candidate items are generated and evaluated, and the best immediate item from the immediate candidate items is selected.

The described recommendation system may be perceived as a navigation system that takes into consideration several possible sequences of events, and evaluates each of the possible sequences by computing a result of a specified value function for each of the possible sequences as if the events in the possible sequences indeed have taken place.

The recommendation system determines, for each particular candidate item that is suitable for recommendation to a customer through a web page at the present time, a separate sequence (or tree of sequences) of subsequent possible candidate items that might be beneficially recommended to the customer through web pages to be subsequently presented to the customer at future times in the event that the customer selected the particular immediate candidate item.

The recommendation system uses statistical information about the customers (also referred to as "users"), and the candidate items to determine the subsequent candidate items that the customers are likely to select after selecting any of the particular candidate items, and then after selecting any of the subsequent candidate items, and so forth. Thus, at any given time, a tree of potential future beneficial recommendations may be generated dynamically based at least in part on the previously recommended candidate items actually selected by the customer.

Recommendation Selection

In one embodiment, the candidate items to be recommended presently are selected from a pool of candidate items that are suitable for recommendation to a user at the present time. These candidate items are hereinafter referred to as "immediate candidate items."

The aspect of "selecting" a particular candidate item may be interpreted rather narrowly as merely a selection of the particular immediate candidate item by the user, or more broadly as a purchase of the recommended candidate item by the user.

The described approach takes into consideration not only the immediate candidate items that a web page may beneficially recommend to a user in a first step, but also the subsequent candidate items that the web page may beneficially recommend to the user in the steps following the presentation of the selected immediate candidate items.

After evaluating the immediate candidate items and the subsequent candidate items, a subset of the immediate candidate items is selected and recommended to the user in the first step. The selected immediate candidate items are herein after referred to as "particular candidate items."

In one embodiment, the selection of the immediate candidate items, subsequent candidate items and particular candidate items is based on (1) the information about the user to whom the recommendation is being made, (2) the individual characteristics of the immediate candidate items, and (3) the information about the sequences of subsequent candidate items that the website may recommend to the user in subsequent steps in the future.

In one embodiment, a server determines a set of immediate candidate items to recommend to a user through a first web page that is to be presented to the user by taking into account a user profile, statistical information, a history log (e.g., a log of web pages and/or candidate items that the user previously visited and/or selected), purchasing habits, purchasing preferences, purchasing history, interests, a profession, etc.

In determining the set of immediate candidate items, the server may also take into account candidate items' statistical information, such as statistical information about the candidate items' popularity, costs, prices, values, availability, and any additional information that might be available about the candidate items.

The server may also take into account information about the likelihood that, if recommended, a candidate item will be indeed selected and/or purchased by the user. For example, the server may utilize information reflecting the quantity of the users who, after selecting or purchasing a particular first book, also purchased a particular second book. Such information might, for example, indicate the ratio of (a) the quantity of users who purchased the particular second book after purchasing the first book to (b) the total quantity of users who purchased the first book.

In one embodiment, evaluation of separate sequences of subsequent possible candidate items includes determining which separate sequence may maximize the outcome expected from recommending a particular immediate candidate item to the user. The outcome is maximized based on the objective specified by the website designers or sponsors. For example, the outcome may be optimized to maximize the revenue generated by the website, the quantity of the sold products, the quantity of selections that the user makes before leaving the website, etc.

The server may maximize the outcome expected from recommending a particular immediate candidate item by computing a value function associated with selecting the particular immediate candidate item and the associated sequence of the subsequent possible candidate items. For example, the server may compute a value function that represents revenue generated by a sale of the particular immediate candidate item and the subsequent possible candidate items. According to another example, the server may compute a value function that represents a length of the sequence of the subsequent possible candidate items associated with the particular immediate candidate item.

In one embodiment, the server generates and sends over the Internet a first website that recommends the particular immediate candidate item to the user. Alternatively, the server may generate and send over the Internet a first website that recommends two or more particular immediate candidate items, each of which was selected according to the approach described above.

Although embodiments of the invention are described in the context of the website-based candidate item recommendation systems, embodiments of the invention may also be applied to other types of the recommendation systems. For example, the described approach may be applicable to offline systems; television shopping networks; marketing tools, etc.

Example System

Figure 1:
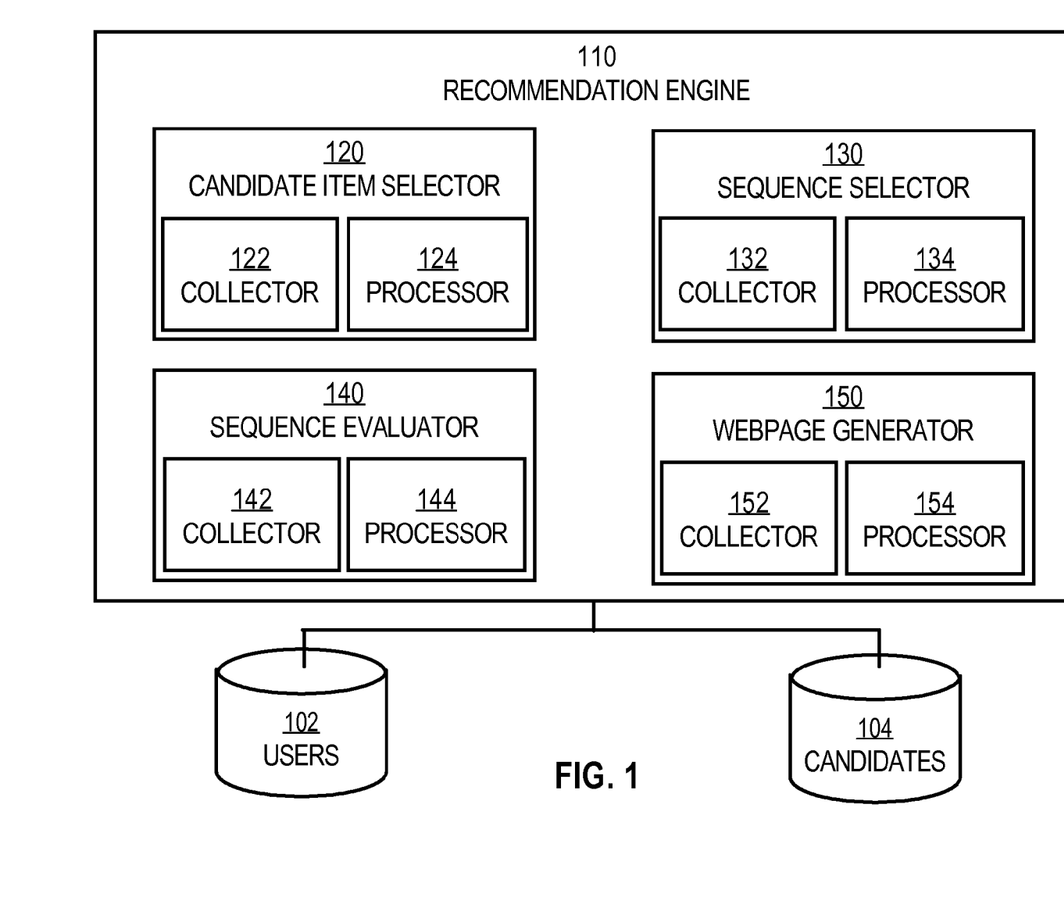
FIG. 1 depicts an example of a system in which an embodiment of the invention may be implemented.

FIG. 1 depicts an example of a system in which an embodiment of the invention may be implemented. The system of FIG. 1 includes a recommendation engine 110, a user database 102, and a candidate item database 104.

In one embodiment, recommendation engine 110 is communicatively coupled with a server providing services to an Internet website. Recommendation engine 110 receives requests from the website server, processes the request, generates a response to the request and provides the response to the website server. Recommendation engine 110 may provide services to a plurality of website servers, each of which can send a number of requests to recommendation engine 110 and receive a response to each of the requests.

Recommendation engine 110 is communicatively coupled with one or more database storages. The storage may be configured as a multi-device system of storages. Alternatively, the database storages may be configured as one, centrally maintained storage system.

In one embodiment, recommendation engine 110 comprises a candidate item selector 120, a sequence selector 130, a sequence evaluator 140 and a webpage generator 150. Candidate item selector 120, sequence selector 130, sequence evaluator 140 and webpage generator 150 may be implemented as separate processes communicating with each other via communication links implemented within recommendation engine 110. Alternatively, the selectors, evaluator and generator may be implemented as a multi-thread-process of recommendation engine 110. Candidate item selector 120, sequence selector 130, sequence evaluator 140 and webpage generator 150 may be embodied in or executed on the same or on different machines, such as the computer depicted in FIG. 3 and described below.

Request for Recommendation

In one embodiment, a web site server sends a request to recommendation engine 110 requesting that recommendation engine 110 determine one or more candidate items that a web page can recommend to a user. In a book-selling example, the website server may request that recommendation engine 110 determine one or more book titles that the website web page can recommend to a user.

While processing the request, recommendation engine 110 may collect, retrieve and use information about the user to whom the recommendation is to be made, information about the users who have interacted with the website, etc. Furthermore, recommendation engine 110 may collect, retrieve and use information about the items that the website advertises, recommends and/or sells to the users.

In on embodiment, the request received by recommendation engine 110 is specific and provides information about the user to whom the recommendation is to be made. For example, the request may contain information about the user profile, demographics, personal characteristics, interests, browsing history, purchasing preferences and history, etc. The request may also contain identifiers and/or links to a database and/or files that contain the user specific information.

The request may also contain information about the type of the candidate items that could be presented to the user. For example, the request may indicate that the term candidate items include merchandises, such as books, clothing items, household items, vacation packages, airline tickets, memberships, etc., or include services, such as online reservations, access to electronic media, etc.

Further, the request may provide the website preferences with regard to the website policy, guidelines, strategy and other information that recommendation engine 110 may find useful in determining the candidate items for recommendation.

Examples of website servers may include the servers that recommend and transact books to online users, the servers that recommend and sell vacation packages to the users, online shopping network servers, online news network servers, etc.

Database Storage

In one embodiment, database storage comprises a user database 102, and a candidate item database 104. Databases 102-104 may be maintained and updated synchronously or independently from each other. Databases 102-104 may be implemented in one physical storage device, or in a distributed, multi-device storage.

User Database

In one embodiment, user database 102 stores various types of information about the users that have been interacting with recommendation engine 110 and/or other recommendation engines. In a book-selling example, user database 102 may store information about the users who purchased online books from one or more book-selling websites, user profiles of the users who purchased online books, users' purchasing preferences, the titles of books that the users have purchased, the frequency in which the users purchase the books, the users' demographic information, the users' interests, the lengths of the online sessions during which the users interacted with the book-selling websites, etc.

Moreover, user database 102 may store information about statistical information related to purchasing transactions. For example, user database 102 may store information about the quantity of users who buy books in a certain genre, the quantity of users who buy books written by a particular writer, the quantity of users who buy books published by a certain publishing company, etc.

In addition, user database 102 may store information about a probability that a particular user will buy books in the certain genre, a probability that the particular user will buy books written by a particular writer, a probability that the particular user will buy books published by a certain publishing company, etc.

Candidate Item Database

In one embodiment, candidate item database 104 stores various types of information about the candidate items that recommendation engine 110 may recommend to users. In a book-selling example, candidate item database 104 may store information about the bestsellers in each genre, the bestseller in each user group age, the bestseller for certain occasions, etc.

Candidate item database 104 may also contain information about each of the candidate items. For example, candidate item database 104 may contain a price of each book, a number of available books that have the same price, a number of books that belong to the same pricing category (e.g., inexpensive, moderately expensive, expensive, very expensive), etc.

In one embodiment, candidate item database 104 contains statistical information about likelihood (or a probability) that a particular candidate item, if recommended to a user, will be indeed selected or purchased by the user. In a book-selling example, candidate item database 104 may contain, for each book that can be offered to the users, a numerical value reflecting the probability that a particular book, if recommended to the user, will be selected and/or purchased by the user.

In one embodiment, for each book available for recommendation, candidate item database 104 stores two or more probability values, wherein the first probability value may reflect the likelihood that a particular book, if recommended to the user, will be selected by the user so the user can be presented with another book recommendation, while the second probability value may reflect the likelihood that the particular book, if recommended to the user, will be not only selected, but also purchased by the user.

Value Function

A value function may correspond to a method that is used to compute costs for the candidate items. In a book-selling example, the value function may be computed using such parameters as a price of the book, a quantity of users who purchased the book, etc. In one example, the value computed using the value function may correspond to the revenue generated from the sales of a particular book, from the sales of a group of particular books, from the sales of all the books transacted by the website during a certain period of time, etc.

In a vacation-package-selling example, the value function may be computed using such parameters as a price of the vacation package, a quantity of users who purchased the vacation package, etc. In one example, the value computed using the value function may correspond to the revenue generated from the sales of a particular vacation package, from the sales of all vacation packages for a particular vacation destination, from the sales of all vacation packages transacted by the website during a certain period of time, etc.

In a news-group-membership example, the value function may be computed using such parameters as a quantity of different membership options, a price of each of the membership option, a quantity of memberships in each membership options that has been sold to the users, etc.

In one embodiment, a value computed using the value function corresponds to the revenue generated from the sales of each membership option, from the sales of all membership that the website offers, from the sales of the memberships transacted by the website during a certain period to time, etc.

Probabilistic Value Function

Statistical information stored in candidate item database 104 may be used to compute a value of the probabilistic value function associated with the candidate items. The probabilistic value function may be used to compute a probable cost of the candidate items. In a book-selling example, the probabilistic value function may be computed using such parameters as a probability that the particular book could be purchased by an individual user, a probability that the particular book could be purchased by a certain group of users, a probability that the particular book could be selected but not purchased by an individual user, etc.

In a membership-selling example, the probabilistic value function may be computed using such parameters as a probability that the particular type of membership could be purchased by an individual user, a probability that, if an individual user purchased one type of membership, then he will also renew the type of membership, a probability that the particular type of membership could be purchased by a certain group of users, etc.

In one embodiment, a value computed using the probabilistic value function corresponds to the probable revenue that could be generated from the sales of the particular items or services. In a book-selling example, the value computed using the probabilistic value function may correspond to the probable revenue that could be generated from the sales of a particular book, from the sales of a group of particular books, or from the sales of all the books that could be transacted by the website during a certain period of time, etc.

Candidate Item Selector

In one embodiment, candidate item selector 120 is a machine-implemented module that selects candidate items. Candidate item selector 120 comprises a collector 122 and a processor 124. Collector 122 collects, requests and updates information about the candidate items, while processor 124 processes the information supplied by collector 122, and provides the information to sequence selector 130.

In one embodiment, candidate item selector 120 is invoked by recommendation engine 110 to select one or more immediate candidate items that could be recommended to a user at the present time. Candidate item selector 120 may be also invoked to select one or more subsequent items that could be recommended to the user in the future, which is after the user hypothetically selected the immediate candidate items recommended to the user. Thus, candidate item selector 120 is invoked to select the immediate candidate items and during the process of generating the trees of subsequent items that could be recommended to the user in the future.

Collector 122 collects information from user database 102, and candidate item database 104. For example, collector 122 may collect (or request to be collected and provided) information about the user profile, purchasing preferences, demographic information, geographic location, purchasing history, etc.

Further, collector 122 may collect (or request to be collected and provided) information about the candidate items that could be recommended to the user. In a book-selling example, collector 122 may identify the website catalog, determine the price of each of the book listed in the catalog, retrieve statistical information about the listed books, sales of the books, etc.

Collector 122 provides the collected information to processor 124 and responds to requests from processor 124 for any additional information.

In one embodiment, processor 124 receives information about the particular user and the particular possible candidate items, processes the received information, and sends the processed information to sequence selector 130.

Processor 124 selects the candidates that are most suitable for the user to whom the recommendation is to be made. For example, if collector 122 provided information that the particular user is a twenty-year-old male who likes sports, and that the possible candidate items include magazines, then processor 124 selects sport magazines from the set of possible candidate items.

In one embodiment, processor 124 takes into consideration statistical information associated with the candidate items stored in candidate database 104. In the above sport-magazines example, after selecting all sport magazines, processor 124 would determine which of the sport magazines the twenty-year-old male who likes sports would find most interesting.

Further, the processing performed by processor 124 may involve restructuring or reorganizing the collected information, and reformatting the information to a format that is compatible with the format used by other modules of recommendation engine 110.

Processor 124 may communicate with sequence selector 130, sequence evaluator 140 and webpage generator 150 each time any of them requires any information about the candidate items or the users.

Sequence Selector

In one embodiment, sequence selector 130 is a machine-implemented module that, for each immediate candidate item, generates a tree of subsequent items that could be recommended to the customers in the future, which is after a user hypothetically selected the immediate candidate item. Sequence selector 130 comprises a collector 132 and a processor 134. Collector 132 collects, requests and updates information that pertains to the selection of possible sequences of candidate items by sequence selector 130, while processor 134 processes the information supplied by collector 132, and provides the selected sequences of candidate items to sequence evaluator 140.

In one embodiment, sequence selector 130 is invoked by recommendation engine 110 after candidate item selector 120 determined one or more immediate candidate items for a web site to recommend to a user. For each immediate candidate item, sequence selector 130 determines first-tier-subsequent items that could be recommended to the user immediately after the user hypothetically selected the particular immediate item. Then, for each immediate candidate item and for each subsequent item, sequence selector 130 determines second-tier-subsequent items that could be recommended to the user immediately after the user hypothetically selected the particular first-tier-subsequent item. The process is repeated until all trees for all immediate candidate items are generated.

The collector 132 usually receives, from candidate item selector 120, the information about the particular user for whom the recommendation is generated, and the information about the possible candidate items, some of which could be recommended to the user. The collector 132 forwards the collected information to processor 134 for further processing.

Further, collector 132 may receive additional requests from processor 134 to collect, request and supply any additional information that processor 134 finds necessary while executing a sequence selection function.

In one embodiment, processor 134 receives information about one or more immediate candidate items that that can be recommended to the user simultaneously and immediately, i.e., at the present moment.

The one or more immediate candidate items are the candidate items that candidate item selector 120 selected for a particular user from a set of all potential candidate items available in candidate item database 104. For example, if the particular user is a twenty-year-old male who likes sports and the website offers various magazines, then the immediate candidate items may include those sport magazines that a twenty-year-old male who likes sports would find interesting.

In one embodiment, for each immediate candidate item from a set of immediate candidate items, processor 134 determines a first-tier of one or more subsequent possible candidate items for subsequent web pages to recommend to the user in the event that the user selected the particular immediate candidate item. To determine the first-tier of the subsequent candidate items for a particular immediate candidate item, processor 134 communicates with candidate item selector 120 described above. The first-tier of the subsequent possible candidate items corresponds to the first-tier items in a tree of subsequent items generated for the particular immediate candidate.

After the first-tier of the subsequent candidate items for each particular immediate candidate items are selected, processor 134 determines, for each particular immediate candidate and each first-tier of the subsequent candidate items for the particular immediate candidate, a second-tier of one or more subsequent possible candidate items for subsequent web pages to recommend to the user in the event that the user selected the particular immediate candid date item and the particular first-tier subsequent candidate item for the particular immediate candidate. To determine the second-tier of the subsequent candidate items, processor 134 communicates with candidate item selector 120 described above. The second-tier of the subsequent possible candidate items corresponds to the second-tier items in a tree of subsequent items generated for the particular immediate candidate. The process is repeated until all tiers of subsequent candidate items for all particular immediate candidates are generated.

Subsequent Items Tree

A separate sequence of two or more subsequent possible candidate items for the particular immediate candidate item comprises those candidate items from a set of all candidate items that a user could subsequently select in the event that the user selected the particular immediate candidate item.

In one embodiment, a separate sequence of subsequent possible candidate items for a particular immediate candidate item represents a sequence of events that represent sequential purchasing of items recommended by the website. For example, if it is known that the users who purchased a subscription to Sports Illustrated also purchased a subscription to ESPN Magazine, and if it is known that the users who purchased a subscription to Sports Illustrated, then purchased a subscription to ESPN Magazine and subsequently purchased a subscription to Sports Weekly, then one possible sequence of subsequent possible candidate items may be represented as follows:

Sports Illustrated→ESPN Magazine→Sports Weekly

In the same example, if the set of immediate candidate item contains two magazines, Sports Illustrated and Sporting News, processor 134 determines a separate sequence of subsequent possible candidate items for the subsequent web pages to recommend to the user in the event that the user selected Sports Illustrated, and determines a separate sequence of subsequent possible candidate items in the event that the user selected Sporting News. In this example, the separate sequence of subsequent possible candidate items for Sport Illustrated may comprise ESPN Magazine and Sports Weekly, while the separate sequence of subsequent possible candidate items for Sporting News may comprise Athletic Business, Athlon Sports and SportsFan Magazine. The corresponding separate sequences of subsequent possible candidate items may be represented as follows:

Sports Illustrated→ESPN Magazine→Sports Weekly
Sporting News→Athletic Business→Athlon Sports→SportsFan Magazine The corresponding trees of subsequent possible candidate items may be represented as follows:

Sports Illustrated
↓
ESPN Magazine
↓
Sports Weekly

Sporting News
↓
Athletic Business
↓
Athlon Sports
↓
SportsFan Magazine

Sequences with Probability Values and Cost Values

In one embodiment, a separate sequence of subsequent possible candidate items has an associated sequence of probability values. For example, if it is known that out of 100 users, 50 users purchased Sports Illustrated, 25 users who purchased Sports Illustrated also purchased ESPN Magazine, and 20 users who purchased Sports Illustrated and subsequently purchased ESPN Magazine also purchased Sports Weekly, then one possible sequence of subsequent possible candidate items and the associated sequence of probability values may be as follows:

Sports Illustrated (50%)→ESPN Magazine (25%)→Sports Weekly (20%)

In one embodiment, a separate sequence of subsequent possible candidate items has an associated sequence of cost values. For example, it is known that the price of an annual subscription to Sports Illustrated is $39.00, the price of an annual subscription to ESPN Magazine is $26.00, and the price of an annual subscription to Sports Weekly is $39.95, then one possible sequence of subsequent possible candidate items and the associated sequence of cost values may be as follows:

Sports Illustrated ($39.00)→ESPN Magazine ($26.00) →Sports Weekly ($39.95)

While there are many approaches for representing separate sequences cumulatively, according to one example, probability values and cost values associated with one separate sequence may be as follows:

Sports Illustrated (50%; $39.00)→ESPN Magazine (25%; $26.00)→Sports Weekly (20%; $39.95)

The processing performed by processor 134 may also involve requesting any additional information necessary for determining the separate sequences, described above, collecting statistical information, sending updated information to collector 132, etc.

Further, the processing performed by processor 134 may involve restructuring or reorganizing the separate sequences, described above, and reformatting the information about the separate sequences to a format that is compatible with the format used by other modules of recommendation engine 110.

Processor 134 may communicate with candidate item selector 120, sequence evaluator 140 and webpage generator 150 each time any of them requires any information about the candidate items, the users and the separate sequences.

Sequence Evaluator

In one embodiment, sequence evaluator 140 is a machine-implemented module that further evaluates sequences of subsequent items determined by sequence selector 130. Sequence evaluator 140 generates its recommendation by taking into consideration not just one or more immediate candidate items that can be recommended to the user at a particular moment, but also the separate sequences of subsequent possible candidate items generated for each particular immediate candidate item for subsequent web pages to recommend to the user in the event that the user selects the particular immediate candidate item.

Sequence evaluator 140 takes into consideration a sequence of possible events for each of the particular immediate candidate items and selects that particular immediate candidate item for which the associated sequence of events could generate the most beneficial outcome. For example, if the objective of the recommendation is to maximize a value of revenue generated by a sale of the books, then sequence evaluator 140 may select that particular immediate candidate item for which the combined value of the sale of the particular immediate candidate item and the associated sequence of possible sequent sales would generate the highest revenue.

In one embodiment, sequence evaluator 140 comprises collector 142 and processor 144. Collector 142 collects, requests and updates information that pertains to the selection of candidate items by candidate item selector 120 and sequence selector 130, while processor 144 processes the information supplied by collector 142, and provides the information to webpage generator 150.

In one embodiment, sequence evaluator 140 is invoked by recommendation engine 110 after sequence selector 130 generated separate sequences of two or more subsequent possible candidate items for each of the particular immediate candidate items, as described above.

Using the information generated by sequence selector 130, collector 142 collects additional information from user database 102, and candidate item database 104 that processor 144 requires to further process to the recommendation request. For example, collector 142 may determine, select and retrieve from candidate item database 104 information about the value function that processor 144 may use to determine or compute a "value" of each immediate candidate item, and a "value" of each separate sequence of subsequent possible candidate items for each particular immediate candidate item.

Values computed using value functions may represent a variety of measures. Some measures may represent a revenue value that can be generated by sales of the recommended candidate items. For example, the value computed using the value function of a particular immediate candidate item may correspond to the revenue generated by a sale of the particular candidate item and a sale of the subsequent possible candidate items to a user. In a magazine-selling example, collector 142 may retrieve information about the prices of annual subscriptions for each of the immediate candidate item selected by candidate item selector 120 and the prices of each subsequent possible candidate item in each of the separate sequence for each particular immediate candidate item selected by sequence selector 130. Alternatively, that information may be provided to processor 144 by sequence selector 130.

Another measure may represent a maximum number of subsequent selections that the user can make subsequently to select each of the particular immediate candidate item one at the time. For example, the value computed using the value function of a particular immediate candidate item may correspond to the total number of candidate item selection that the user can make in the event that the user selected the particular immediate candidate item. In a magazine-selling example, collector 142 may retrieve information about the length of each of the separate sequences of the subsequent possible candidate items, determined for each of the particular magazine, and for recommendation in the event that the user selected the particular immediate magazine.

Other examples of specific measures used by the value functions include, but are not limited to, a total quantity of sales, a total quantity of recommendation, a value of a probable revenue, a value of a probable number of sales, a value of a probable number of recommendation, etc.

Example of Computing a Value Function

In a magazine-selling example, processor 144 computes a value function for each of the sequences, described above, i.e.:

Sports Illustrated→ESPN Magazine→Sports Weekly
Sporting News→Athletic Business→Athlon Sports→SportsFan Magazine In one embodiment, processor 144 computes a value function by adding the corresponding costs associated with each candidate item. For example, if the prices associated with each of the magazines in one of the above sequences are as follows:
Sports Illustrated ($39.00)
ESPN Magazine ($26.00)
Sports Weekly ($39.95),
then the value associated with that particular sequence is $39.00+$26.00+$39.95=$104.95. The value of $104.95 corresponds to the revenue that would be generated if, after Sports Illustrated was recommended to the user, the user not only purchased a subscription to Sports Illustrated but also purchased a subscription to ESPN Magazine, and then, purchased a subscription to Sports Weekly. The process is repeated for each of the separate sequences for each of the particular immediate candidate item until all the values associated with each of the separate sequences are known.

If the system policy is to maximize the value of revenue generated by the sales, then processor 144 may recommend that particular immediate candidate item for which the value function computed for the associated separate sequence of subsequent possible candidate items returns the highest value. For example, if the value for one separate sequence:
(Sports Illustrated→ESPN Magazine→Sports Weekly) is $104.95,
and for another separate sequence:
(Sporting News→Athletic Business→Athlon Sports→SportsFan Magazine) is $55.55,
for which details not provided here, then the separate sequence of Sports Illustrated→ESPN Magazine→Sports Weekly is more desirable since it could potentially generate a higher value of revenue that the separate sequence of Sporting News→Athletic Business→Athlon Sports→SportsFan Magazine. Accordingly, in this example, processor 144 may recommend that Sports Illustrated be a particular immediate candidate item for a first web page to recommend to the user.

The above approach may also take into consideration probability values associated with each of the separate sequences for each of the immediate candidate items. For example, if a separate sequence of subsequent possible candidate items for "Sports Illustrated" has the following associated probability values:
Sports Illustrated (50%; $39.00)→ESPN Magazine (25%; $26.00)→Sports Weekly (20%; $39.95),
then, one of the possible probable values associated with that particular sequence is:

0.5*$39.00+0.25*$26.00+0.2*$39.95=$19.5+$6.5+ $7.99=$33.99

Using the selected approach, processor 144 computes probable values for each of the separate sequences and selects that sequence which meets the recommendation criteria the best. Accordingly, in this example, processor 144 may recommend that particular immediate candidate item to the user that has the highest associated value.

Click-Through-Rate Approach

Implementations of calculating the value function may vary. One of the exemplary implementation may be based on the "click-through-rate" (CTR) approach, which is a way of measuring the success of online product advertising. A CTR may be computed by dividing the number of users who selected a particular advertisement on a web page by the number of times the particular advertisement was presented to the user in one browsing session. Other approaches may be implemented as well.

In one embodiment, the system policy allows recommending more than one particular immediate candidate item to the user at each given step. For example, processor 144 may use threshold values that allow determining which of the immediate candidate items have associated values that meet the threshold requirements. In a magazine-selling example, processor 144 may select for recommendation those immediate candidate items for which annual-subscription-sales of all candidate items in the corresponding separate sequences generate the revenue of at least $100.00. Hence, in a particular example, there might be more than just one particular immediate candidate item that met the threshold requirement, more than just one particular immediate candidate item may be recommended to the user in one recommendation step.

In one embodiment, processor 144 analyzes a limited quantity of immediate candidate items and analyzes a limited quantity of subsequent possible candidate items in the separate sequences of the separate candidate items. For example, processor 144 may look at no more than "D" immediate candidate items, where "D" is a variable with an associated value. Furthermore, processor 144 may analyze the separate sequences that contain no more than "L" subsequent candidate items, where "L" is a variable with an associated value. Hence, a path corresponding to a particular subsequent sequence may have length no larger than "L." Parameter "L" is often referred to as a look-ahead parameter.

For example, if "D" has a value of 2 and "L" has a value of 3, then processor 144 can analyze only two immediate candidate items at the time, and for each immediate candidate item, processor 144 analyzes the separate sequences that contain no more than 3 candidate items. This can be illustrates in the following example, in which each of two immediate candidate items has an associated tree containing subsequent choices that will be analyzed by processor 144:

Immediate candidate item #1

Immediate candidate item #2

In the above example, the sequences provided for immediate candidate item #1 are the following sequences:
A→B→D
A→C→E
F→G→I
F→H The sequences provided for immediate candidate item #2 are as follows:
K→L→N
K→L→O
K→L→P
K→M→R

S→T→U
S→T→V

Recursion of the Sequence Evaluation

The depth of the recursion is controlled by the look-ahead parameter "L." In one implementation, the CTR algorithm computes a click-through-rate for each of the sequence by taking into consideration only "L" items in each sequence. Processor 144 selects that candidate item which has a path with the highest associated overall click-through-rate value. Implementation examples may include an approach based on the Viterbi algorithm, although other approaches may be used as well.

In the above example, if processor 144 determines that item "A" should be recommended in the first step and the user indeed selected the recommended item "A," then the user information is updated, candidate item information is updated and selecting history is updated as well. Then, the processes of generating the immediate candidate items starts from the beginning, and the generating of the separate subsequent candidate items starts from the beginning as well.

The process of generating the immediate candidate items and the process of generating of separate sequences of the subsequent candidate items start from their respective beginnings even if the user does not select the recommended item "A." In fact, the processes of candidate item selection, sequence selection and sequence evaluation can be repeated each time the new information about the user selection and about the selected candidate items is obtained by the recommendation engine 110.

Information about the recommendations determined by processor 144 is sent to web page generator 150 for further processing. In addition, the information about the recommendation may be sent to corresponding databases, such as user database 102, and candidate item database 104. The recommendation information is used to update the user preferences, the user selection history, the user state, etc.

Webpage Generator

In one embodiment, webpage generator 150 is a machine-implemented module that receives one or more candidate item recommendations, and generates a webpage with the recommendations for the user. Webpage generator 150 is invoked each time a set of recommended items is determined by sequence evaluator 140.

Webpage generator 150 comprises a collector 152 and a processor 154. Collector 152 collects, requests and updates information that pertains to the recommendation generated and supplied by sequence evaluator 140 and that is stored in user database 102, and candidate item database 104.

Collector 152 collects information about the recommended particular immediate candidate item(s) for a first web page to recommend to the user, and forwards the information to processor 154.

Collector 152 may also retrieve software modules, classes of objects, variables and code modules that processor 154 may need to generate the web page with the recommendations.

Processor 154 receives recommendation information and generates a web page that contains the recommendations to the user and sends the web page over the Internet to the user. Processor 154 may execute the web page generation code, instantiate the objects and execute the steps of the web page generation.

Example Selection of Immediate Candidate Items

Figure 2:
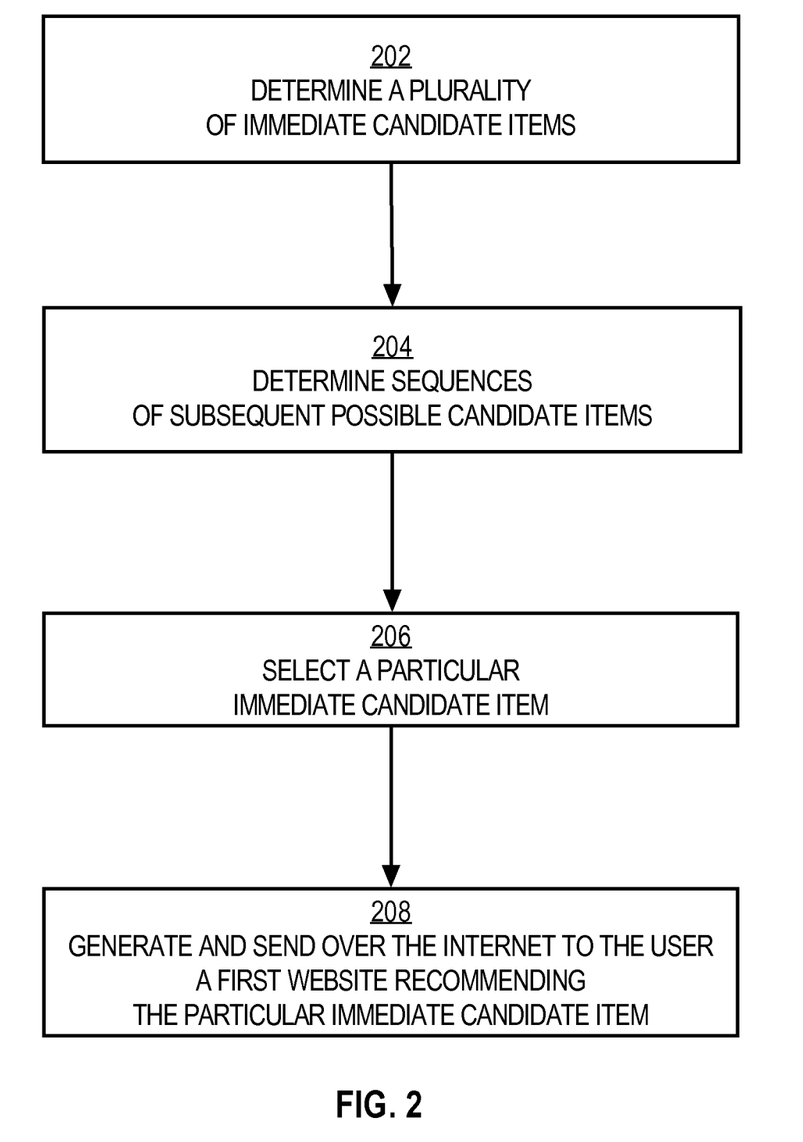
FIG. 2 depicts an example of technique for determining candidate item recommendations to a user, by determining immediate candidate items that are suitable for recommendation presently, and determining one or more subsequent candidate items that would be suitable for recommendation in the future in the event that the immediate candidate item of that sequence actually is presently recommended, in accordance with an embodiment of the invention.

FIG. 2 depicts an example of technique for determining, for a user, candidate item recommendations, by determining immediate candidate items that are suitable for recommendation presently, and determining one or more subsequent candidate items that would be suitable for recommendation in the future in the event that the immediate candidate item of that sequence actually is presently recommended, in accordance with an embodiment of the invention.

In block 202, recommendation engine 110 determines a plurality of immediate candidate items that are suitable for recommendation to a user presently. The determination of the immediate candidate items is performed based on the information about the user profile, preferences, web browsing history, purchasing history, etc., and the information about candidate items that the website is able to recommend.

In block 204, recommendation engine 110 determines, for each of the immediate candidate items, one or more separate sequences of subsequent possible candidate items for subsequent web pages to recommend to the user in the event that the user selected the particular immediate candidate item. A sequence of subsequent possible candidate items may be represented as a tree of the subsequent items selected for a particular immediate candidate item and "rooted" at the particular immediate candidate item.

The determination of the sequences of subsequent candidate items is performed based on the information about the user profile, preferences, web browsing history, purchasing history, etc., and the information about candidate items that the website is able to recommend.

Each of the subsequent possible candidate items enlisted in a particular separate sequence is a candidate item that is not going to be immediately recommended to the user by the first web page. The subsequent possible candidate items enlisted in the particular separate sequence associated with the particular immediate candidate item are just possible candidate items that may be recommended to the user in the event that the user selected the particular immediate candidate item first.

In block 206, recommendation engine 110 selects a particular immediate candidate item from the plurality of the immediate candidate items for the first web page to recommend to the user. The determination of the particular candidate item is performed by computing a specific value of a value function for each of the particular immediate candidate item and its associated sequence, and, based on the computed value, identifying that particular immediate candidate item that is the stronger contender to be recommended to the user. Examples of specific approaches for computing the specific value of the value function are provided above.

In block 208, recommendation engine 110 generates and sends over the Internet to the user a first website containing the particular immediate candidate item determined to be the best recommendation choice for the particular user at the particular time.

Alternatively, recommendation engine 110 may determine more than one particular immediate candidate item to be recommended to the user. Thus, the first web page may contain two or more particular immediate candidate items that recommendation engine 110 selected as the best choices to be recommended to the user at the particular time. For example, if the function value is defined in such a way that compares the special values with a threshold value, then more than one immediate candidate item may have the special values that exceed the threshold value, and thus may become the recommended immediate candidate items.

Example of Generating Book Candidate Items to Maximize Revenue

The recommendation approach described above may be implemented in a website server that advertises and sells online books to the users. The exemplary website may have access to one or more databases containing information about the online users who have registered with the website and provided their preferences, profiles, interests, browsing and purchasing history, etc. The website may also have access to one or more databases containing information about the books that the website may sell online, as well as statistical information about each offered book, etc.

Upon receiving a request for recommendation, the recommendation engine gathers characteristics of the user for whom the recommendation is being derived and determines a set of immediate book candidate items that may be recommended to the user at the particular time. The set of immediate book candidate items will most likely meet the user's preference to some extend and, to some extend, satisfy the recommendation policies implemented in the recommendation engine.

In the next steps, the recommendation engine determines, for each immediate book candidate item, a separate sequence of two or more subsequent possible books for subsequent web pages to recommend to the user in the event that the user selected the particular immediate book candidate item. The recommendation engine uses statistical information about the users and the book purchases to determine which subsequent books the users select after selecting each of the particular immediate book, and then after selecting the subsequent books, and so forth.

In determining the ultimate book recommendation to the user at the particular moment, the recommendation engine takes into consideration not only each of the immediate book candidate items, but also possible subsequent recommendations that can be made by the subsequent web pages in the future. For example, if there are two immediate book candidate items, the trees of the subsequent possible candidate items for each of the immediate book candidate items may be depicted as follows:

In the next steps, the recommendation engine computes a value for each of the identified separate sequences using, for example, the CTR approach, and selects the separate sequences that has the highest value, or for which the values is above a predefined threshold. For example, the recommendation engine may determine that the tree of the sequences for the first item (see the tree for the immediate book candidate item #1, above) can potentially generate revenue of $555.00 if the user indeed selects and purchases each and every book depicted in the first tree, while the tree of the sequences for the second item (see the tree for the immediate book candidate item #2, above) can potentially generate revenue of $600.00 if the user indeed selects and purchases each end every book depicted in the second tree. If the recommendation engine tries to maximize the value of revenue that can be potentially generated by the sale of the online books by the website, then recommending the second immediate book candidate item is the best choice at the moment, since it has the highest possible revenue value. Therefore, in this example, the second immediate book candidate item will be most likely recommended to the user at the present time.

In some implementations, the recommendation engine may present more than one immediate book candidate item at the time. In other implementations, the recommendation engine may rather optimize the number of potentially sold books than the total value of potentially generated revenue.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
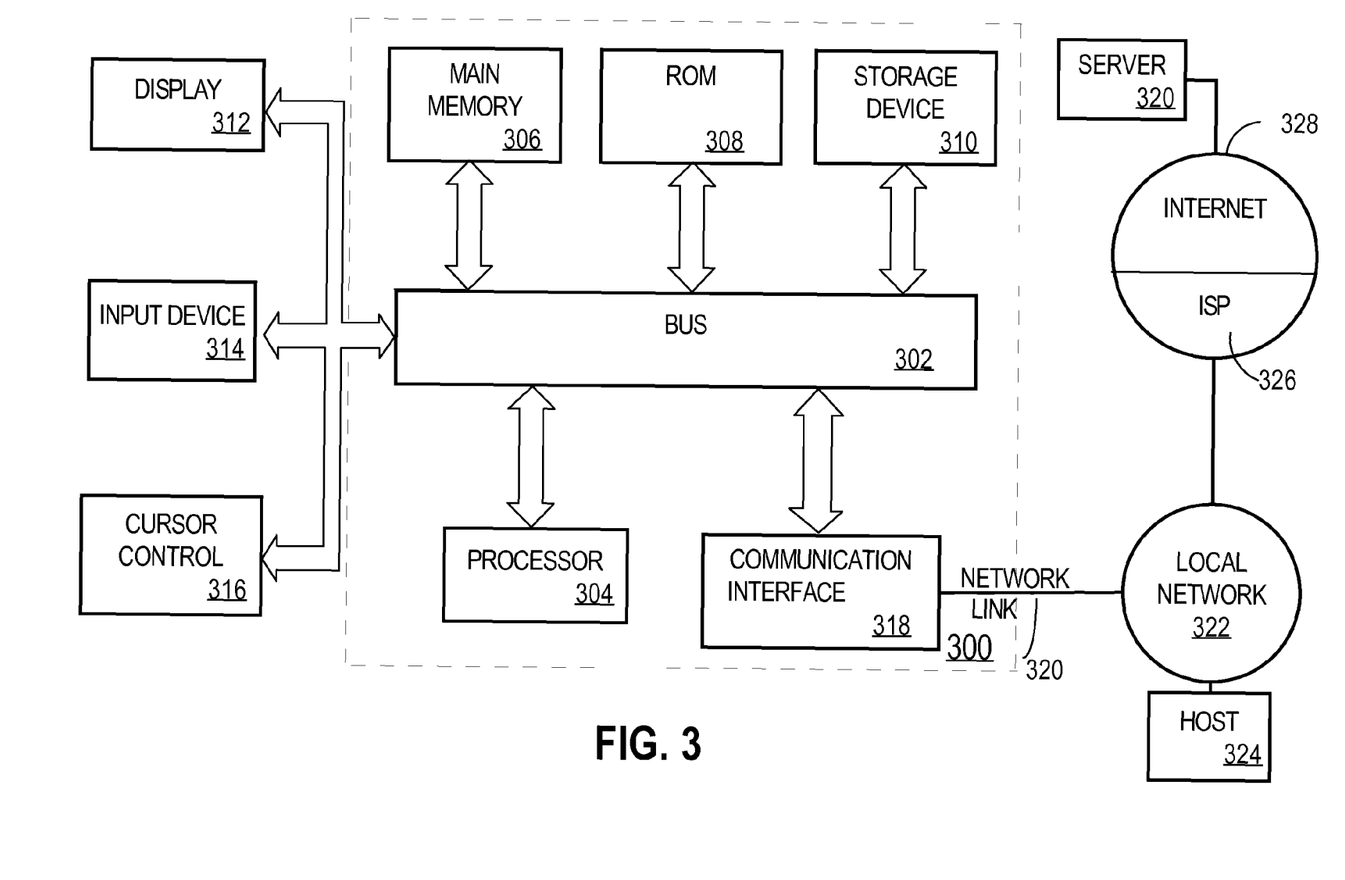
FIG. 3 is a block diagram of a computer system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising steps of:
   determining a plurality of immediate candidate items for a first web page to be recommended to a user;
   for each immediate candidate item of the plurality of immediate candidate items:
   (a) determining a separate sequence of two or more subsequent possible candidate items for subsequent web pages to be recommended to the user in the event that the user selects the immediate candidate item;
   (b) associating the separate sequence of two or more subsequent possible candidate items with the immediate candidate item;
   (c) determining a potential revenue value generated in the event that the user selects the immediate candidate item and each of the subsequent possible candidate items from the separate sequence that is associated with the immediate candidate item;
   selecting for the first web page, from the plurality of immediate candidate items, a particular immediate candidate item for which the potential revenue value is the highest;
   recommending to the user the particular immediate candidate item in the first web page;
   wherein the method is performed by one or more special-purpose computing devices.

2. The method of claim 1, wherein determining a plurality of immediate candidate items for recommendation further comprises determining a history log associated with the user that contains information about selections that the user made in the past.

3. The method of claim 1, wherein determining a plurality of immediate candidate items for recommendation is performed each time the user makes a selection or a purchase of a candidate item.

4. The method of claim 2, wherein the history log is updated each time the user selects an immediate candidate items from the plurality of candidate items.

5. The method of claim 2, wherein the history log is updated each time the user selects an immediate candidate item from the plurality of candidate items and transacts to purchase the immediate candidate item.

6. The method of claim 1, further comprising selecting for the first web page, from the plurality of immediate candidate items, the particular immediate candidate item for which a maximum number of subsequent selections exceeds a threshold.

7. The method of claim 1,
wherein the potential revenue value is a function of an individual cost of the immediate candidate item and each of the subsequent candidate items that might be presented to the user if the user selects the immediate candidate item, and an individual probability that each of the subsequent candidate items will be selected by the user;
wherein the individual cost of a candidate item represents a revenue that is generated if the candidate item is selected and purchased by the user;
wherein the individual probability of a candidate item represents a click-through-rate that the user might select and purchase the candidate item.

8. An apparatus comprising:
one or more processors;
a candidate item selector unit configured to perform: determining a plurality of immediate candidate items for a first web page to recommend to a user;
a sequence selector unit configured to perform: for each immediate candidate item of the plurality of immediate candidate items:
 (a) determining a separate sequence of two or more subsequent possible candidate items for subsequent web pages to be recommended to the user in the event that the user selects the immediate candidate item;
 (b) associating the separate sequence of two or more subsequent possible candidate items with the immediate candidate item;
 (c) determining a potential revenue value generated in the event that the user selects the immediate candidate item and each of the subsequent possible candidate items from the separate sequence that is associated with the immediate candidate item;
a sequence evaluator unit configured to perform: selecting for the first web page, from the plurality of immediate candidate items, a particular immediate candidate item for which the potential revenue value is the highest;
a webpage generator unit configured to perform: recommending to the user the particular immediate candidate item in the first web page.

9. The apparatus of claim 8, wherein determining a plurality of immediate candidate items for recommendation further comprises determining a history log associated with the user that contains information about selections that the user made in the past.

10. The apparatus of claim 8, wherein determining a plurality of immediate candidate items for recommendation is performed each time the user makes a selection or a purchase of a candidate item.

11. The apparatus of claim 9, wherein the history log is updated each time the user selects an immediate candidate items from the plurality of candidate items.

12. The apparatus of claim 9, wherein the history log is updated each time the user selects an immediate candidate item from the plurality of candidate items and transacts to purchase the immediate candidate item.

13. The apparatus of claim 8, wherein the sequence evaluator unit is further configured to select for the first web page, from the plurality of immediate candidate items, the particular immediate candidate item for which a maximum number of subsequent selections exceeds a threshold.

14. The apparatus of claim 8,
wherein the potential revenue value is a function of an individual cost of the immediate candidate item and each of the subsequent candidate items that might be presented to the user if the user selects the immediate candidate item, and an individual probability that each of the subsequent candidate items will be selected by the user;
wherein the individual cost of a candidate item represents a revenue that is generated if the candidate item is selected and purchased by the user;
wherein the individual probability of a candidate item represents a click-through-rate that the user might select and purchase the candidate item.

15. A non-transitory computer-readable storage medium that stores instructions which, when executed by one or more processors, cause the one or more processors to perform steps comprising:
determining a plurality of immediate candidate items for a first web page to be recommended to a user;
for each immediate candidate item of the plurality of immediate candidate items:
 (a) determining a separate sequence of two or more subsequent possible candidate items for subsequent web pages to be recommended to the user in the event that the user selects the immediate candidate item;
 (b) associating the separate sequence of two or more subsequent possible candidate items with the immediate candidate item;
 (c) determining a potential revenue value generated in the event that the user selects the immediate candidate item and each of the subsequent possible candidate items from the separate sequence that is associated with the immediate candidate item;
selecting for the first web page, from the plurality of immediate candidate items, a particular immediate candidate item for which the potential revenue value is the highest;
recommending to the user the particular immediate candidate item in the first web page.

16. The computer-readable medium of claim 15, wherein the instructions that cause the one or more processors to perform determining a plurality of immediate candidate items for recommendation further comprise instructions, which cause the one or more processors to perform determining a history log associated with the user that contains information about selections that the user made in the past.

17. The computer-readable medium of claim 15, wherein the instructions that cause the one or more processors to perform determining a plurality of immediate candidate items for recommendation are executed each time the user makes a selection or a purchase of a candidate item.

18. The computer-readable medium of claim 16, wherein the history log is updated each time the user selects an immediate candidate items from the plurality of candidate items.

19. The computer-readable medium of claim 16, wherein the history log is updated each time the user selects an immediate candidate item from the plurality of candidate items and transacts to purchase the immediate candidate item.

20. The computer-readable medium of claim 15, further comprising instructions which, when executed, cause the one or more processors to perform selecting for the first web page, from the plurality of immediate candidate items, the particular immediate candidate item for which a maximum number of subsequent selections exceeds a threshold.

21. The computer-readable medium of claim 15,
wherein the potential revenue value is a function of an individual cost of the immediate candidate item and each of the subsequent candidate items that might be presented to the user if the user selects the immediate candidate item, and an individual probability that each of the subsequent candidate items will be selected by the user;
wherein the individual cost of a candidate item represents a revenue that is generated if the candidate item is selected and purchased by the user;
wherein the individual probability of a candidate item represents a click-through-rate that the user might select and purchase the candidate item.

22. The computer-implemented method of claim 1, wherein the steps (a)-(c) are performed for each immediate candidate item of the plurality of immediate candidate items before recommending any item from the plurality of immediate candidate items to the user.

23. The apparatus of claim 8, wherein the sequence selector unit is further configured to perform the steps (a)-(c) for each immediate candidate item of the plurality of immediate candidate items before recommending any item from the plurality of immediate candidate items to the user.

24. The non-transitory computer-readable storage medium of claim 15, wherein the instructions for performing the steps (a)-(c) further comprise instructions which, when executed, cause performing the steps (a)-(c) for each immediate candidate item of the plurality of immediate candidate items before recommending any item from the plurality of immediate candidate items to the user.

\* \* \* \* \*